United States Patent Office 2,753,367
Patented July 3, 1956

2,753,367

CATALYTIC HYDROGENATION OF CARBON MONOXIDE

Walter Rottig, Oberhausen-Sterkrade-Nord, and Walter Wischermann, Oberhausen-Sterkrade, Germany, assignors to Ruhrchemie Aktiengesellschaft, Oberhausen-Holten, Germany, a corporation of Germany, and Lurgi Gesellschaft fuer Waermetechnik, m. b. H., Frankfurt am Main, Germany, a corporation of Germany No Drawing. Application July 3, 1953,
Serial No. 366,066

Claims priority, application Germany July 9, 1952

15 Claims. (Cl. 260—449.6)

This invention relates to improvements in the catalytic hydrogenation of carbon monoxide.

In the process for the catalytic hydrogenation of carbon monoxide and particularly of the type effected with catalysts which contain elements of the eighth group of the periodical system, such as iron, cobalt and nickel, which may contain activators and supporting materials, it is known to pre-treat catalysts with reducing gases prior to commencing the synthesis proper in order to obtain a favorable catalyst activity. This reducing pre-treatment is effected with hydrogen and/or carbon monoxide, and is generally effected to convert a certain portion of the metal catalyst material which is present as an oxide into the metallic state. The statements in the literature of the art on the most favorable portion of metal as compared with a reduced oxide vary within wide limits. Values between 5% and 100% of free metal based on the total metal have been suggested, depending on the type of catalyst in the synthesis products desired. The percentage of the total basic catalyst metal in the free metallic state is known as the reduction value of the catalyst.

Elevated working temperatures are required for the conversion of a portion of the oxides into the free metallic state with the use of reducing gases, since at normal temperatures the reaction velocity is much too low to effect a useful reduction value within a reasonable time. Temperatures of above 150° C. and generally of above 250° C. have been used, depending on the type of catalyst in order to obtain the desired degree of reduction within a reasonable time, as, for example, from 1 to 10 hours.

Varied reduction temperatures are used, depending on the type of catalyst and the basic metal. For example, temperatures of from 350° to 400° C. are used for the conventional precipitated cobalt catalyst in order to obtain a reduction value of 55–65%. When using precipitated iron catalysts, temperatures of as low as 200°–250° C. are frequently sufficient if relatively low reduction values are to be obtained. However, temperatures ranging between 250° and 320° C. have generally been used for these catalysts, whether the same contained carrier material or not.

In connection with fused and sintered catalysts, the reduction is much more difficult, due to a completely different physical construction as compared with that of precipitated catalysts. Temperatures of about 450° C., and even as high as 600° to 1,000° C. have been used for the reduction of these fused and sintered catalysts.

One object of this invention is a highly active precipitated iron catalyst which has an excellent grain strength and resistance to splintering and which has been reduced at relatively low temperatures. This, and still further objects, will become apparent from the following description:

It has now been found that precipitated iron catalysts which contain at least 5 parts by weight and not more than 5 parts by weight of copper and/or silver to 100 parts of iron, and which have been reduced with gases containing carbon monoxide and/or hydrogen at temperatures below 150° C., are excellently suited and produce particularly favorable results in catalytic carbon monoxide hydrogenation effected at temperatures of 175° to 275° C. at pressures of 1–100 and preferably 10–40 atmospheres.

The catalyst should preferably contain more than 15 parts by weight of copper and/or silver to 100 parts of iron and may, if necessary or desired, contain activators and supporting materials. The catalysts should preferably be reduced at temperatures below 125° C. These catalysts very surprisingly, in spite of the very low reduction temperature, exhibit a structure of high strength which is very favorable for their activity and possess at the same time a sufficient reduction value.

Prior to the invention, catalysts rich in copper and silver were frequently unsatisfactory from a mechanical standpoint in reduced form. With reduction temperatures of above 150° C., a considerable content of undesirable dust and splintered grains was frequently observed after the reduction, even if completely uniform grains were present prior to the reduction. The result of this phenomenon was that after charging the catalyst mass, as, for example, into a tubular furnace, obstructions by caking of the small particles very frequently occurred. This is always accompanied by a more or less high pressure loss which results in many cases in a complete shut-down of the respective catalyst tube.

Very surprisingly, the copper- and/or silver-rich catalysts reduced in accordance with the invention at temperatures below 150° C. do not show this unfavorable mechanical behavior and have a grain structure which resists disintegration. In the synthesis the catalysts in accordance with the invention exhibit an excellent mechanical behavior and have an extremely long life period of operation, while the pressure loss is very low.

Sufficiently high reduction values may be obtained in accordance with the invention within 30–120 minutes when using reduction temperatures of below 150° C. and preferably below 125° C. Temperatures between 80° and 110° C. have been found particularly effective. The lowest temperature which may be used is 60 C. Minimum reduction values to which the catalysts are reduced are 15, the preferred range of reduction values being 22–40%.

The reducing pre-treatment in accordance with the invention may be effected at atmospheric pressure as well as at super-atmospheric pressure or in partial vacuum. In general, the reduction may be conveniently effected at atmospheric pressures, though reduction at pressures above 1 atmosphere have produced excellent results. Corresponding to the synthesis pressure, pressures of 1–100 atmospheres and preferably 10–40 atmospheres are used.

Particularly good synthesis results may be obtained with the catalysts which have been pre-treated with the use of high-flow velocities of the reducing gas, as, for example, flow velocities in excess of 50 cm. per second, and preferably above 1 m. per second, referred to standard conditions (760 mm. Hg, 0° C.).

Certain differences in, for example, the mechanical behavior of the catalyst, have been found to exist, depending on whether hydrogen or carbon monoxide or mixtures thereof are used for the reduction. When using hydrogen, a certain mechanical alteration of the catalyst cannot be completely avoided in a small number of cases in spite of the lower reduction temperatures. Excellent mechanical properties of the catalyst are uniformly obtained when the reduction pre-treatment is effected with the use of carbon monoxide or carbon monoxide- and hydrogen-containing gases having a CO:H₂ ratio of about 1:1 to 1:1.5.

It has further been found in accordance with the invention that a surprising improvement of the synthesis results can frequently be obtained if the catalysts, prior to their reduction, are dried to a water content of below 2% and preferably of below 0.5% by weight by re-drying the same at temperatures of below 200° C. and preferably at 130° to 170° C. The lowest re-drying temperature used is 110° C. The water content in the precipitated catalysts after molding and drying ranges generally between 8% and 12%, based on the weight of the catalyst, and it has been found to have a marked disadvantageous influence on the catalyst structure if this water is not removed prior to the reduction.

Catalysts dried at a temperature above 200° to 300° C., while showing a very good mechanical behavior after reduction, sometimes work unsatisfactorily in the subsequent synthesis. It is therefore likely that the heat treatment effected in the temperature range above 200° C. will be of some detrimental effect to the activity of the catalyst.

It is thus disadvantageous to remove the water content of the catalyst by pre-drying at temperatures above 200° C. and especially at 300° C., since this effects more or less large alteration in the catalyst structure, which, in turn, effects the activity and the synthesis behavior of the catalyst. The low water content desired of below 2% must therefore be achieved by re-drying below 200° C. and preferably between 130° and 170° C. Lower temperatures require a length of time which is not technically and economically feasible. Catalysts dried in accordance with the invention show in the reduced state a considerably improved resistance to abrasion as compared with water-containing catalysts, without yielding any disadvantages in the subsequent synthesis.

Particularly economical operation is assured when effecting the reduction under pressure if the gas quantity used for the reduction is recycled, while the portions of carbon monoxide and/or hydrogen consumed during the reduction is replenished by the addition of fresh gas. Thus, the pressure drop may be observed and measured and compensated by the addition of fresh gas.

It is of advantage if the reducing gases, as is conventional, have as low as possible a water content, as, for example, less than 1 gram, and preferably less than 0.1 gram of water per cubic meter of reducing gas.

The following examples are given by way of illustration and not limitation:

Example 1

A catalyst was precipitated from a boiling solution which contained 40 grams of iron and 10 grams of copper per liter in the form of the nitrates by pouring this solution into a boiling soda solution. The precipitation was effected in such a manner that the pH value after the precipitation was 7.1. Immediately thereafter, the hot catalyst slurry was washed with distilled water to a residual alkali content of about 0.3% calculated at K₂O and based on total iron.

Then the catalyst mass was impregnated with potassium water glass containing 8 parts by weight of K₂O and 20.5 parts by weight of SiO₂, and the excess alkali was removed by carefully adding nitric acid so that the pH value was again 7.1, and by subsequent filtration. The K₂O:SiO₃ ratio was about 1:5 and the quantity of SiO₂ based on total iron was about 25%.

After the impregnation, the catalyst was molded to small cylinders of 3.5 mm. diameter and dried for 24 hours at 105° C. Thereafter, the water content was about 9%.

8 liters of this catalyst were reduced, in a reduction vat of corresponding capacity, for 1 hour at 135° C. at atmospheric pressure with a gas mixture consisting of 75% H₂ and 25% N₂. The flow velocity based on standard conditions was about 1.5 m. After the termination of the reduction, the catalyst was filled into a container under CO₂ protection. The reduction value was 27%, the abrasion test was good. The shrinkage as compared with the unreduced grains was 25%.

The same catalyst, reduced at 190° C., had a very poor abrasion test. In a reactor of 10 meters in length the pressure loss during the synthesis was so high that the reactor had to be shut down. As contrasted to this, the catalyst reduced at 135° C. had a pressure loss of only 2.5 atmospheres in the same reactor.

Example 2

The same catalyst, reduced under the same conditions with water gas, resulted in an abrasion test which was by 20% better. The shrinkage was the same as in Example 1.

Example 3

8 liters of a catalyst corresponding to Example 1 were filled into a synthesis tube of 10 m. length and 32 mm. diameter. Thereafter, water gas was passed in under a pressure of 20 atmospheres and the catalyst was reduced for 150 minutes at 110° C. The quantity of gas put through by means of a compressor was 12 cu. m. per hour.

After discharging, this catalyst had a reduction value of 28% of free iron; the abrasion test was by 40% more favorable than in Example 1.

When using hydrogen instead of water gas, practically the same values were obtained.

It was very surprisingly found that it was not necessary to remove the carbon dioxide from the reducing gas. As contrasted to the prior art, there was no difference between the activity of catalysts which had been reduced with CO₂-containing gases and that of catalysts which had been reduced with CO₂-free gases.

Example 4

A catalyst was produced as described in Example 1. The only difference was that immediately following the precipitation 10 parts of kieselguhr based on 100 parts of iron were stirred in. The subsequent measures for washing, impregnating, drying and molding of the catalyst were identical with those of Example 1.

8 liters of this catalyst were filled into a tube of 10 m. length and 32 mm. inside diameter. After blowing in nitrogen for a short time, hydrogen at a rate of 5 cu. m. per hour was passed into the tube and the temperature was increased within 2 hours from 20° C. to 135° C. Thereafter, the reduction was discontinued. The catalyst had an excellent resistance to abrasion and a reduction value of 26 which was practically completely uniformly present over the whole length of the tube.

This catalyst was subsequently used for the synthesis in the same tube at a pressure of 25 atmospheres, a load of 500 liters of gas per liter of catalyst per hour and a recycle ratio of 1:2.5. The CO:H₂ ratio of the synthesis gas was 1:1.7 and the CO+H₂ content was 85%. A CO+H₂ conversion of 62% was obtained at a temperature of 222° C. This conversion could be increased to 74% by increasing the temperature to 230° C.

If the same catalyst was reduced in the same reaction tube with hydrogen at a pressure of 15 atmospheres and at the same temperature while circulating 5 std. cu. m. per hour of reducing gas consisting of 75% of hydrogen and 25% of nitrogen, and while continuously supplementing the consumed hydrogen, a completely uniform reduction value of 27% was obtained. The mechanical strength was likewise excellent. The synthesis result obtained under the conditions mentioned before was practically identical with that obtained with the catalyst which had been reduced at atmospheric pressure.

Example 5

A boiling solution which contained 40 grams of iron and 6 grams of copper in the form of the nitrates was added to a boiling soda solution. The precipitated mass was rapidly sucked off and washed with hot condensate to a residual alkali content of about 0.3% based on iron and calculated as $K_2O$. The following impregnation was effected with potassium water glass in such a manner that the finished catalyst mass contained 2.5% $K_2O$ and 7.1% $SiO_2$. The drying was effected for 24 hours at 110° C. Thereafter, the mass was re-dried for 2 hours at 180° C. by means of an air stream. The reduction of this catalyst was carried out in a tube of 50 mm. diameter and 5 m. length, which was heated up within 2 hours to a temperature of 135° C. The quantity of hydrogen put through was 12.5 cu. m. per hour. After the termination of the reduction, the reduction value was 28%.

If this catalyst was used for the synthesis under the conditions of Example 5, a $CO+H_2$ conversion of 65% was obtained at a temperature of 218° C. This conversion could be increased to 75% by increasing the temperature to 225° C.

Example 6

A catalyst mass was precipitated from a boiling solution of the nitrates of iron and copper by pouring the solution into a boiling soda solution. Thereafter, the catalyst mass was washed with condensate to a residual alkali content of 0.3% calculated as $K_2O$. The pH value after the precipitation was 7.1. The Fe:Cu ratio was 100:25. After a subsequent impregnation with potassium water glass followed by a post-neutralization, the catalyst contained 5 parts of $K_2O$ and 25 parts of $SiO_2$ based on 100 parts of iron.

Thereafter, the catalyst mass was molded into small cylinders of 3.5 mm. diameter, which were then dried for 24 hours at a temperature of about 110° C. This was followed by a re-drying for 6 hours at 160° C. The water content of this catalyst was about 0.3%. The finished grains were sieved on a 1.5 mm. sieve.

8 liters of this catalyst were reduced in a synthesis tube of 10 m. length and 32 mm. inside diameter for 2 hours at a temperature of 135° C. with hydrogen using a linear gas velocity of 1.5 m. Thereafter, the finished catalyst had a reduction value of 25.7.

This catalyst was subsequently subjected to the following synthesis conditions:

| | |
|---|---|
| Gas load | 1:500. |
| Synthesis pressure | 25 atmospheres. |
| Recycle ratio | 1:2.5 |
| $CO:H_2$ ratio | 1:1.7. |
| $CO+H_2$ content | 86%, the remainder being nitrogen, carbon dioxide and methane. |

A $CO+H_2$ conversion of 64% was obtained at a temperature of 219° C. The methane formation was 3.2%. These synthesis conditions could practically be maintained during the first month of operation.

The synthesis result of the second month of operation was as follows:

| | |
|---|---|
| Synthesis temperature ° C | 219 |
| $CO+H_2$ conversion percent | 63 |
| Methane formation do | 4.5 |

The synthesis result of the third month of operation was a 62% $CO+H_2$ conversion at the same temperature. The methane formation had increased to 6.3%.

The synthesis result of the fourth month of operation was a 61.5% $CO+H_2$ conversion at the same temperature. The methane formation had slightly increased to 6.5%.

Also in the fifth month of operation it was not necessary to increase the synthesis temperature. The $CO+H_2$ conversion was still above 60%. However, in the following months of operation a slight increase of the synthesis temperature had to be effected, but the final synthesis temperature after 8 months was only 225° C. so that the catalyst could be operated for further 4 months with the aid of a further slight increase in temperature.

Example 7

A catalyst was produced in the manner described in Example 5. Instead of copper the same quantity of silver was used. The other steps were the same as in Example 5.

After reduction at a temperature of 135° C., the catalyst had a reduction value of 26%.

At a synthesis temperature of 223° C., the $CO+H_2$ conversion was 63%.

We claim:

1. In the process for the catalytic hydrogenation of carbon monoxide in which a carbon monoxide, hydrogen-containing synthesis gas is contacted with a precipitated iron catalyst at a temperature between 175° and 275° C. at a pressure of 1 to 100 atmospheres, the improvement which comprises reducing a precipitated iron catalyst containing at least 5 parts by weight per 100 parts iron of a member selected from the group consisting of copper, silver and mixtures thereof, with a reducing gas containing a member selected from the group consisting of hydrogen, carbon monoxide and mixtures thereof, at a temperature from 60° C. to below 150° C., and thereafter using said catalyst for said contacting with synthesis gas.

2. Improvement according to claim 1, in which said catalyst contains at least 15 parts per weight per 100 parts of iron of said first-mentioned group member.

3. Improvement according to claim 1, in which said reduction is effected at a temperature below 125° C.

4. Improvement according to claim 3, in which said reduction is effected at a temperature between 80° and 110° C.

5. Improvement according to claim 1, in which said contacting is effected at a pressure of 10 to 40 atmospheres.

6. Improvement according to claim 1 in which said precipitated iron catalyst is dried prior to said reduction, and, which includes redrying said catalyst prior to said reduction to a water-content of below 2% at a temperature of below 200° C.

7. Improvement according to claim 6, in which said redrying is effected at a temperature of 130° to 170° C.

8. Improvement according to claim 7, in which said re-drying is effected to a water content of below 0.5% by weight.

9. Improvement according to claim 1, in which said reduction is effected at pressure above 1 atmosphere.

10. Improvement according to claim 1, in which said reducing gas contains carbon monoxide and hydrogen in a ratio of about 1:1 to 1:1.5.

11. Improvement according to claim 1, in which said reduction is effected at a pressure between 1 and 100 kg. per sq. cm. at flow velocities of said reducing gas of more than 50 cm./second referred to standard conditions of 760 mm. Hg and 0° C.

12. Improvement according to claim 11, in which said reduction is effected at a pressure between 10 and 40 kg. per sq. cm. at a reducing gas flow velocity of more than 50 cm./second referred to standard conditions (760 mm. Hg and 0° C.).

13. Improvement according to claim 11, in which said reduction is effected at a reducing gas flow velocity of more than 100 cm./second referred to standard conditions.

14. Improvement according to claim 12, in which said reduction is effected at a reducing gas flow velocity of more than 100 cm./second referred to standard conditions.

15. Improvement according to claim 1, which includes recycling the used reduction gas in contact with said catalyst and replacing the quantity of consumed reduction gas with fresh reduction gas.

References Cited in the file of this patent

UNITED STATES PATENTS 2,617,774  Rottig et al. _____ Nov. 11, 1952

FOREIGN PATENTS 502,024  Belgium _____ Sept. 20, 1951